United States Patent [19]

Fromson et al.

[11] 4,201,821

[45] May 6, 1980

[54] DECORATED ANODIZED ALUMINUM ARTICLE

[75] Inventors: Howard A. Fromson, 15 Rogues Ridge Rd., Weston, Conn. 06066; Robert F. Gracia, Scituate, Mass.

[73] Assignee: Howard A. Fromson, Weston, Conn.

[21] Appl. No.: 972,585

[22] Filed: Dec. 22, 1978

[51] Int. Cl.[2] ........................ B32B 3/00; B32B 15/04; B32B 27/08; D06P 1/16

[52] U.S. Cl. ........................................ 428/203; 8/444; 204/18.1; 204/159.19; 428/457; 428/461; 428/914; 428/500; 428/515

[58] Field of Search ............... 428/203, 457, 461, 500, 428/515, 914; 204/18 R, 18 PC, 159.19; 106/28; 96/115 R; 8/2.5 A, 39 A, 2.5 R

[56] References Cited

U.S. PATENT DOCUMENTS

| | | | |
|---|---|---|---|
| 3,380,831 | 4/1968 | Bernard et al. | 96/115 R |
| 3,484,342 | 12/1969 | Blake et al. | 204/18 R |
| 3,562,119 | 2/1971 | Krueger | 204/18 PC |
| 3,673,140 | 6/1972 | Ackerman et al. | 106/28 X |
| 3,700,643 | 10/1972 | Smith et al. | 204/159.19 |
| 3,707,346 | 12/1972 | Markert et al. | 8/39 A |
| 3,712,871 | 1/1973 | Pasternack | 106/28 X |
| 3,792,968 | 2/1974 | Rickenbacher et al. | 8/39 A X |
| 3,804,736 | 4/1974 | Pasternack | 204/159.19 X |
| 3,829,286 | 8/1974 | Anzai et al. | 8/2.5 A |
| 4,059,471 | 11/1977 | Haigh | 8/2.5 A |

*Primary Examiner*—Thomas J. Herbert, Jr.

*Attorney, Agent, or Firm*—Sprung, Felfe, Horn, Lynch & Kramer

[57] ABSTRACT

Anodized aluminum having a porous, unsealed anodic oxide layer is provided with a polymeric coating over the oxide layer that is substantive to a sublimatable dye. A sublimated dye forms a design or image in the oxide layer and the polymeric coating. Single and multi-color designs and images can be used for nameplates, dials and signs.

6 Claims, 2 Drawing Figures

DECORATED ANODIZED ALUMINUM ARTICLE

BACKGROUND

This invention relates to decorating anodized aluminum with single or multi-color designs and images using sublimatable dyes for making nameplates, dials, signs and the like.

Blake et al in U.S. Pat. No. 3,484,342 issued Dec. 16, 1969, suggest decorating unsealed anodized aluminum using a heat transfer process followed by sealing for example by immersion in boiling water for one-half hour. This has drawbacks because anodized aluminum becomes sealed by reacting with moisture in the air. The Blake et al process thus requires freshly anodized substrate and the decorator is put to the added trouble of a lengthy sealing step.

SUMMARY

The present invention provides a method for decorating anodized aluminum with a design or image which overcomes the prior art problems by first coating an anodized aluminum substrate having a porous unsealed anodic oxide layer thereon with a polymeric material which is substantive to a sublimatable dye, contacting the polymeric coating with the design or image containing a sublimatable dye, for instance printed or imaged onto a carrier, and then heating the design or image to a temperature and for a time sufficient to cause the dye to sublimate and condense in the oxide layer and the polymeric coating. Because the polymeric coating is substantive to the sublimatable dye, the sublimated dye in the vapor state in effect passes through the polymeric coating and condenses in the underlying porous anodic oxide layer as well as in the polymeric coating itself. Stated differently, the polymeric coating over the anodic oxide layer can be permeated by a sublimated dye in the vapor state.

The aluminum article of the invention finds use as a nameplate, sign, dials or the like includes an aluminum substrate having a porous unsealed anodic oxide layer with a polymeric coating thereover which is substantive to a sublimatable dye. A sublimated dye forms a design or image in the oxide layer and in the overlying polymeric coating.

DESCRIPTION OF THE DRAWING

The present invention will be more fully understood from the following description taken in conjunction with the accompanying drawing wherein.

DESCRIPTION

Figure 1:
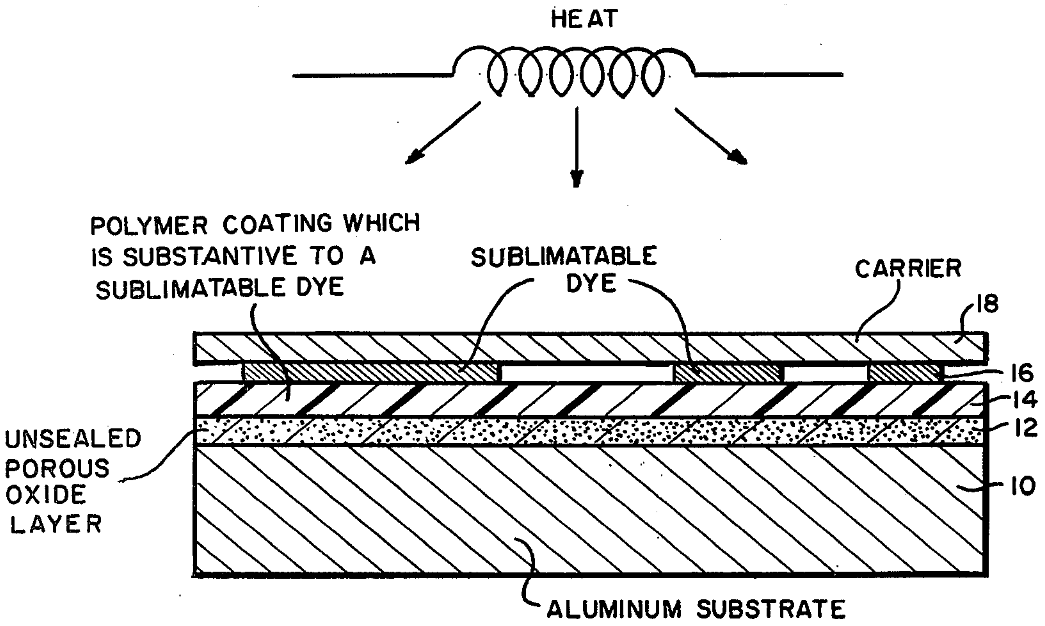
FIG. 1 is a cross-sectional diagrammatic view illustrating the method of the invention.

In the drawing, FIG. 1 shows aluminum substrate 10 having a porous unsealed anodic oxide layer 12. The layer 12 can be formed for example by anodizing aluminum in a sulfuric acid electrolyte as is well known in the art.

Figure 2:
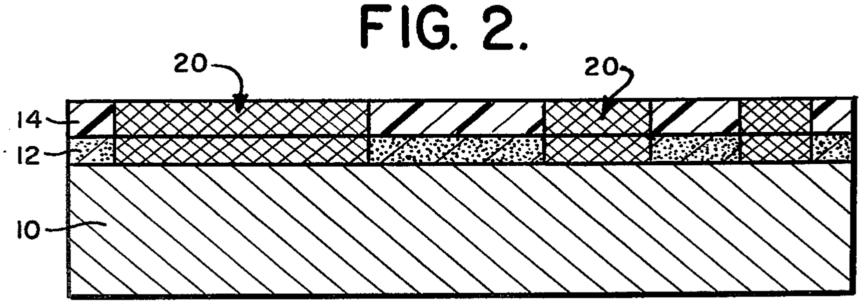
FIG. 2 is a cross-sectional diagrammatic representation showing an anodized aluminum article decorated with a design in accordance with the invention.

Overlying the anodic layer 12 is a layer of a polymeric coating 14 which is substantive to a sublimatable dye. The polymeric coating 14 is contacted with a design containing a sublimatable dye. In FIG. 1, by way of illustration, a carrier 18 has deposited thereon a design or image 16 which contains a sublimatable dye. Heating the design 16 to a temperature and for a time sufficient to cause the dye to sublimate results in condensation of the dye in the oxide layer 12 and the overlying polymeric coating 14. This is shown in FIG. 2 by reference numeral 20.

The polymeric film 14 can be applied using conventional coating techniques such as brushing, spraying, roller coating and the like. The coating 14 should be as thin as possible so as to provide a continuous polymeric coating over the anodic oxide layer 14. Thicker films are not needed or desired because they cost more and lengthen the time for the sublimation transfer step. The polymer coating 14 will generally have thicknesses of 1 mil or less.

The polymeric coating 14 can be deposited in the form of a latex emulsion, for example an acrylic emulsion manufactured by Polyvinyl Chemical Industries under the trademark Neocryl. The polymer can be deposited from a solution coating for example nitrocellulose in butylacetate and ethanol.

The polymeric coating 14 can be clear or it can be tinted and it can be cured or treated after being applied over the anodic oxide layer 12, for example using radiation and/or heat. Suitable curable polymer formulations are manufactured for example by Celanese Corporation and contain a multi-functional acrylate monomer, a UV reactive oligomer and a photo-initiator. After coating and exposure to a UV source, a tough radiation cured clear coating results which is substantive to a sublimatable dye.

Suitable radiation curable and photopolymerizable compositions for the polymeric layer 14 are described in the following patents:

U.S. Pat. No. 3,297,745: 1967
U.S. Pat. No. 3,380,831: 1968
U.S. Pat. No. 3,673,140: 1972
U.S. Pat. No. 3,700,643: 1972
U.S. Pat. No. 3,712,871: 1973
U.S. Pat. No. 3,804,736: 1974

The polymeric film 14 can also be a polymeric composition which can be cured by exposure to an electron beam, for example as disclosed in U.S. Pat. Nos. 3,586,526-30, 1971.

The design or image for the anodized aluminum is preferably first put onto a carrier or transfer member such as the carrier member 18 shown at FIG. 1 which has a design 16 deposited thereon which contains a sublimatable dye. The image or design 16 can be in one or more colors and can be deposited on the carrier in any number of conventional ways including offset printing and electrostatic imaging such as xerography, zinc oxide imaging or charge transfer imaging utilizing an electrostatic toner composition containing a sublimatable dye. Naturally, if the design or image to be sublimated onto the anodized aluminum contains words or symbols, a mirror image of the design or image is deposited on the carrier 18.

A laser tranfer technique can also be used to transfer a sublimatable dye coated on a carrier to the anodized aluminum substrate with the polymeric coating 14. In this case, the sublimatable dye would be coated over the entire surface of the carrier or it would be imprinted in the form of the desired image 16 as shown in FIG. 1. The carrier 18 is a laser transparent film such as a polyester film coated or imaged with a dye that can be sublimated by laser imaging. If necessary or desired, oxidizable or explosive constituents may be used to encourage transfer or to alter the sensitivity of the laser responsive coating or image. Nitrocellulose, peroxides, azides and nitrates are examples of such constituents. To transfer an image or selected portions of the dye coating to form the sublimated image 20 in the anodized aluminum, a beam of energy from a laser which produces wavelengths in the infrared region such as a YAG (Yttrium--Aluminum-Garnet) laser which has an effective wavelength of about 1.06 microns, or an argon laser which has an effective wavelength in a range of from about 0.48 to about 0.52 microns, is focused by means known in the art through the laser transparent film to the interface between the dye coating and the polymeric coating 14. The energy provided by the laser beam causes the dye coating to sublimate leaving a clear area on the laser transparent carrier film. The use of direct imaging techniques such as electrostatic imaging, as mentioned previously, and the use of laser imaging techniques have real advantages because they eliminate preprinting prior to transfer of the image or design to the anodized aluminum thus permitting one step direct design or image transfer.

A sublimatable dye is one that will (under proper conditions of temperature and pressure) pass directly from the solid state without ever going through the liquid state. Temperatures will generally be in the range of 140° F. to 500° F. and pressures in the range of 1 to 10 psi, depending on the character of the material being worked with. Suitable materials have a sublimation half-life (the time required for one-half of a given amount of material to pass from the solid to the vapor state) in this temperature range of from 0.5 to 75 seconds. The preferred temperature range is 180° F. to 450° F. and the more preferred range is 250° F. to 425° F. Suitable sublimation materials are described in U.S. Pat. Nos. 3,484,342, 3,707,346, 3,792,968 and 3,829,286. A number of different colored dyes can be used at the same time to create a multi-colored design or image.

Heat transfer dyes commonly used in dry heat transfer printing of textiles can be used. Many of these materials are known as disperse dyes examples of which are as follows:

YELLOW

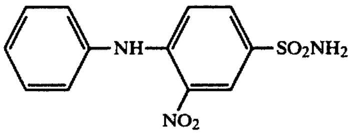

Yellow 33

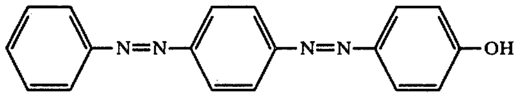

Yellow 23

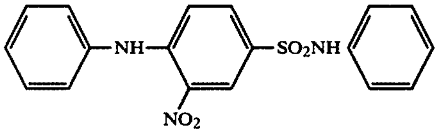

Yellow 42

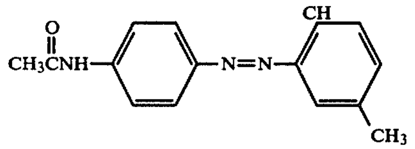

Yellow 3

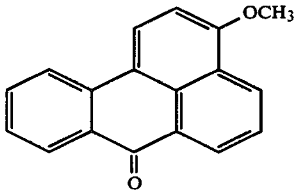

Yellow 13

ORANGE

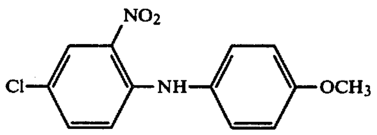

Orange 15

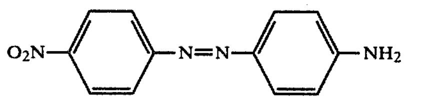

Orange 3

-continued
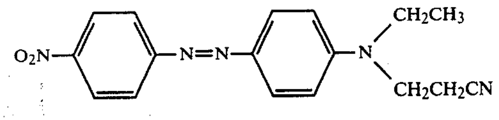
Orange 25
RED
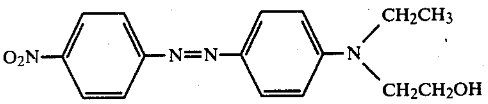
Red 1
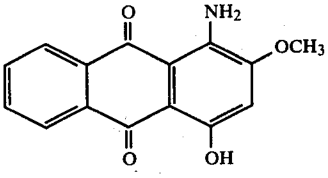
Red 4
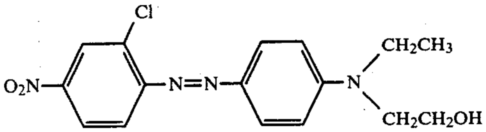
Red 13
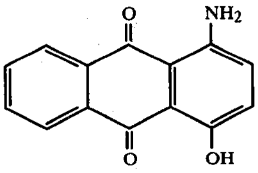
Red 15
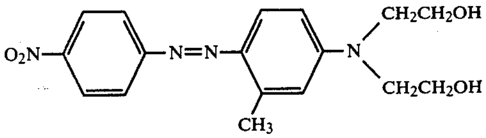
Red 17
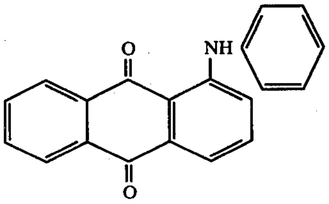
Red 22
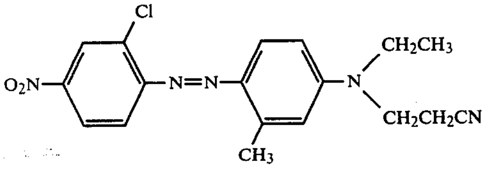
Red 65
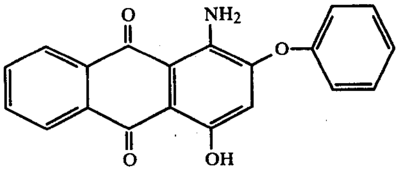
Red 60
VIOLET
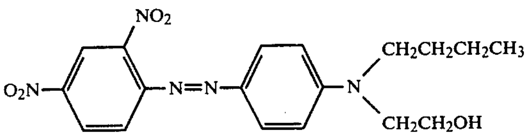
Violet 12
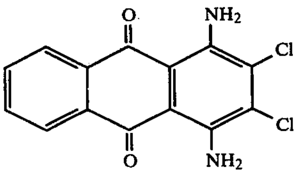
Violet 28
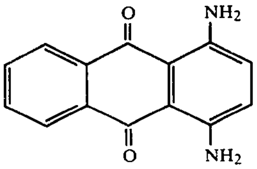
Violet 1
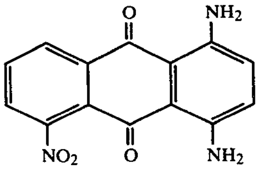
Violet 8

-continued

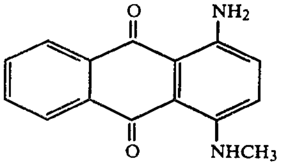

Violet 4

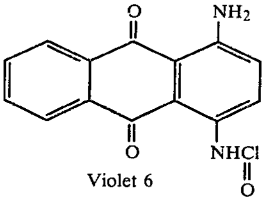

Violet 6

BLUE

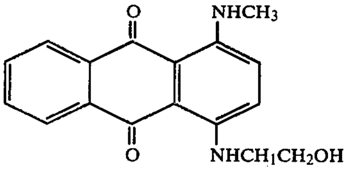

Blue 3

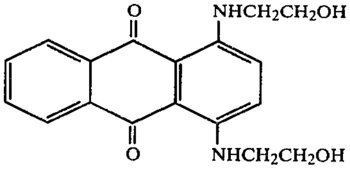

Blue 23

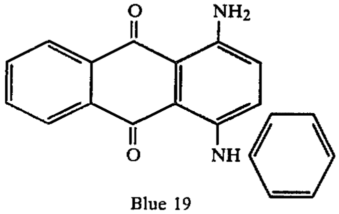

Blue 19

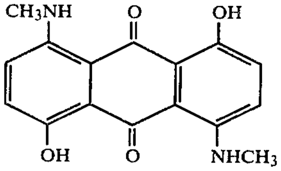

Blue 26

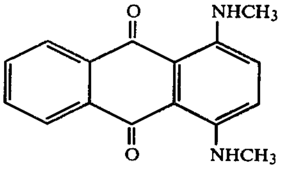

Blue 14

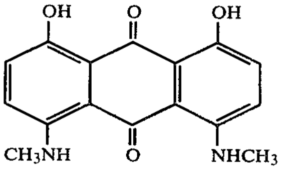

Blue 35

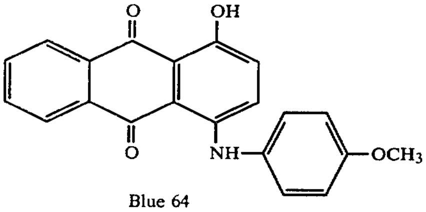

Blue 64

BROWN

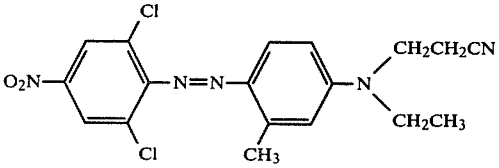

Brown 2

Disperse type inks generally contain from 5–20% by weight disperse dye, preferably about 10% such inks are commercially available and the following (manufactured by Crompton and Knowles Corp. of Fair Lawn, N.J.) are useful in practicing the invention:

Intratherm Yellow P-345NT
Intratherm Yellow P-340NT
Intratherm Yellow P-342
Intratherm Yellow P-343NT
Intratherm Yellow P-346
Intratherm Brilliant Yellow P-348
Intratherm Brilliant Orange P-365
Intratherm Orange P-367
Intratherm Orange P-368
Intratherm Pink P-335NT
Intratherm Brilliant Red P-314NT
Intratherm Red P-334
Intratherm Red P-336
Intratherm Red P-339
Intratherm Scarlet P-355

Intratherm Scarlet P-358
Intratherm Violet P-344NT
Intratherm Blue P-304NT
Intratherm Blue P-305NT
Intratherm Blue P-306NT
Intratherm Brilliant Blue P-308
Intratherm Blue P-310NT New
Intratherm Dark Blue P-311NT
Intratherm Brown P-301
Intratherm Dark Brown P-303
Transfer Black XB-6
Transfer Black XB-8

Heat transfer dyes can be formulated into coatings containing from 5–20% by weight (preferably about 10% by weight) disperse dye and applied to a carrier such as paper, plastic or the like for laser transfer. Formulations based on conventional wet or dry toners can be used to form an image on a carrier using electrostatic copying techniques such as xerography, zinc oxide or charge transfer imaging. Toners containing 5–60% by weight disperse dye, preferably 10–40% by weight, can be employed.

The following examples are intended to illustrate the invention without limiting same:

In the following examples, aluminum (Alcoa Alloy-1100) is degreased and anodized in 15–25% sulfuric acid for 125 AMP-minutes. Following anodizing, the aluminum is rinsed and dried and left unsealed.

EXAMPLE 1

Anodized and unsealed aluminum prepared as described above is coated with an acrylic emulsion, NeoCryl A-601 furnished by Polyvinyl Chemical Industries. The coating is dried. The anodized aluminum with the acrylic overcoating is then imaged by placing face down a paper carrier having a printed image thereon formed by offset printing using an ink having a sublimatable dye.

The ink formulation containing a sublimatable dye is sold by Sinclair & Valentine Co. for heat transfer textile printing under the trade name Black NY 83,779. Similar results are obtained by imaging with Sinclair & Valentine Inc. formulations containing sublimatable dyes designated Red NY 83,983, Blue NY 83,982 and Yellow NY 83,777.

The carrier with the sublimatable image is placed face down on the anodized and coated aluminum and the two are placed in a heat transfer press for 20 seconds at 60 PSI and 375° F. Upon removal from the transfer press, the image transfers from the carrier member into the anodic layer on the aluminum and is also present in the overlying portions of the polymeric coating. The image could not be removed by dipping in acetone which is a solvent for the acrylic coating, indicating that the sublimatable dye had in fact sublimated and condensed into the pores of the anodic oxide layer.

By way of comparison, the anodized aluminum is sealed in nickel acetate before applying the A-601 acrylic emulsion and again imaged as described above. In this instance, the image is readily removed by acetone indicating that it is only on or in the polymer coating covering the sealed anodic layer.

In a second control, aluminum is again sealed in nickel acetate but no acrylic emulsion coating is applied. In this instance, no image transfers to the sealed anodic surface.

EXAMPLE 2

Example 1 is repeated using an acrylic copolymer emulsion NeoCryl A-622. The results are the same as in Example 1 namely, the image transfers by sublimation into the anodic oxide layer as well as the overlying portions of the polymer coating.

EXAMPLE 3

Example 1 is duplicated using a different acrylic emulsion, NeoCryl A-604 and again, the results are the same as in Examples 1 and 2.

EXAMPLE 4

Anodized and unsealed aluminum is coated with a solution of nitrocellulose having the following composition:

R.S. Nitrocellulose ½ sec (Hercules)—7 grs
Dibutylphthalate—3 grs
Buytlacetate—180 mls
Ethanol—20 mls After drying the coated anodized and unsealed aluminum is imaged as described in Example 1 with the same results as in Example 1.

EXAMPLE 5

Anodized and unsealed aluminum in coil form is fed to an electron beam coating machine manufactured by Energy Sciences, Inc. The anodized aluminum is coated with an epoxyacrylated coating supplied by Mobil Chemical Company, No. 414. The coating is applied by a gravure roll at a speed of 50 ft./min. and is passed under an electron beam which cures the coating almost instantaneously. The coated anodized and unsealed aluminum web is then dyed with sublimation dyes as in Example 1, using heat transfer equipment furnished by Archie Simon & Associates of Roswell, Georgia. Upon transfer via sublimation of the dye, the transferred image is found to be present in the anodic oxide layer as well as in the overlying portions of the electron beam cured coating via an immersion in acetone which does not remove any of the transferred image.

What is claimed is:

1. Aluminum article decorated with a design comprising:
(a) an aluminum substrate having a porous, unsealed anodic oxide layer thereon;
(b) a polymeric coating over the oxide layer which is substantive to a sublimatable dye; and
(c) a sublimated dye forming said design in the oxide layer and the overlying polymeric coating.

2. Aluminum article of claim 1 wherein the polymeric coating is applied as an emulsion coating.

3. Aluminum article of claim 1 wherein the polymeric coating is applied as a solvent coating.

4. Aluminum article of claim 1 wherein the polymeric coating is a UV cured coating.

5. Aluminum article of claim 1 wherein the polymeric coating is an electron beam cured coating.

6. Aluminum article coating of claim 1 wherein the dye is a disperse-type dye.

* * * * *